United States Patent [19]

Onodera et al.

[11] Patent Number: 4,725,776
[45] Date of Patent: Feb. 16, 1988

[54] MAGNETIC POSITION DETECTOR USING A THIN FILM MAGNETORESISTOR ELEMENT INCLINED RELATIVE TO A MOVING OBJECT

[75] Inventors: Hiromi Onodera, Nara; Noriaki Wakabayashi, Hirakata; Yasushi Sugizaki, Neyagawa, all of Japan

[73] Assignee: Matsushita Electric Industry Co., Ltd., Osaka, Japan

[21] Appl. No.: 695,049

[22] Filed: Jan. 25, 1985

[30] Foreign Application Priority Data

Jan. 25, 1984 [JP] Japan .............................. 59-12302
Oct. 1, 1984 [JP] Japan .............................. 59-205807
Nov. 19, 1984 [JP] Japan .............................. 59-243717

[51] Int. Cl.$^4$ .................. G01B 7/14; G01R 33/02
[52] U.S. Cl. .................................. 324/208; 324/252; 338/32 R
[58] Field of Search ............... 324/207, 208, 225, 252, 324/235; 338/32 R

[56] References Cited

U.S. PATENT DOCUMENTS 4,492,922 1/1985 Ohkubo .............................. 324/207
4,506,217 3/1985 Rothley et al. .................... 324/208

Primary Examiner—Reinhard J. Eisenzopf
Assistant Examiner—Walter E. Snow
Attorney, Agent, or Firm—Wenderoth, Lind & Ponack

[57] ABSTRACT

A magnetic detector of the present invention employs magneto-resistive elements and detects magnetic teeth of an object to be detected, and more particularly, a constant DC magnetic field is supplied to the magneto-resistive elements in such a way so as to avoid a non-linear region of the DC magnetic field to permit the use of such elements in the region exhibiting good linearity. The present invention provides the DC magnetic field to the magneto-resistive elements by employing a simple structure wherein the magneto-resistive elements are arranged inclined relative to the magnetic field defined between a permanent magnet and the magnetic teeth. Furthermore, the magneto-resistive elements having two phases delayed by $\pi/2$ are used in a half-bridge so as to improve the stability, waveform distortion, etc. with respect to the temperature of the detected signal.

10 Claims, 31 Drawing Figures

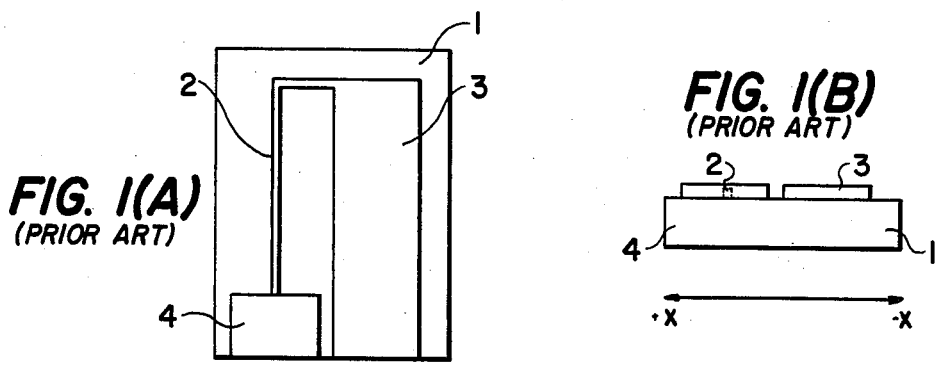
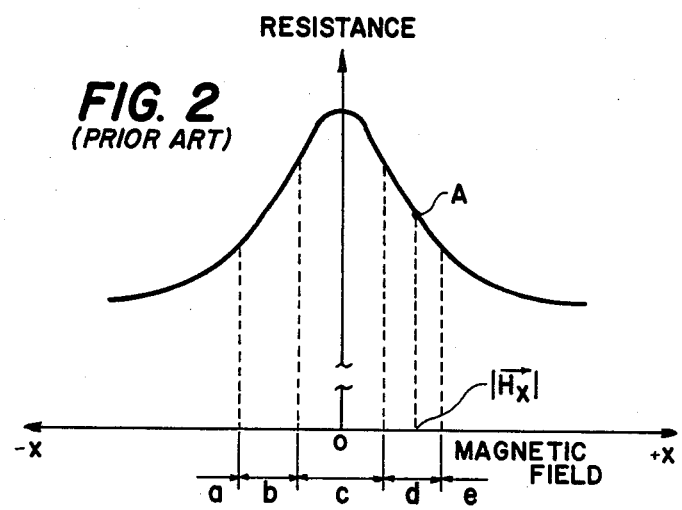
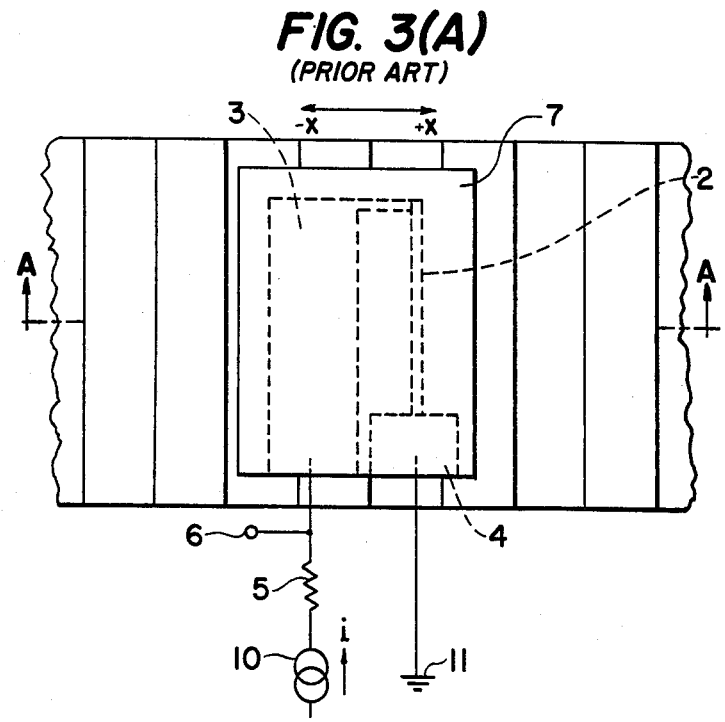

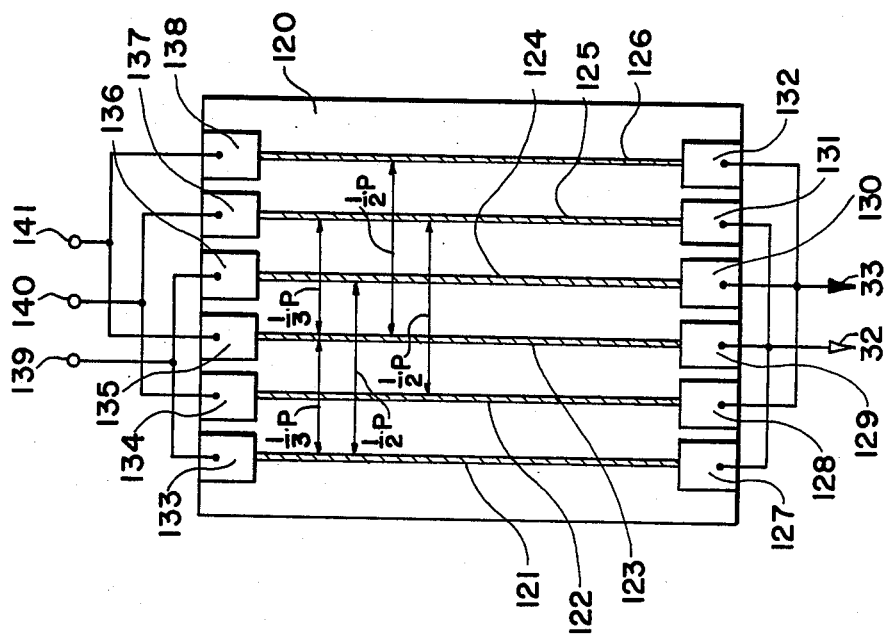
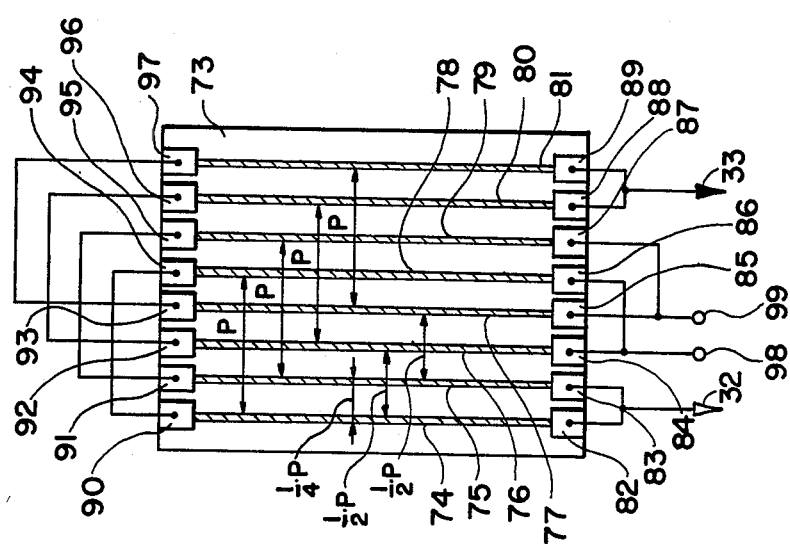

MAGNETIC POSITION DETECTOR USING A THIN FILM MAGNETORESISTOR ELEMENT INCLINED RELATIVE TO A MOVING OBJECT

BACKGROUND OF THE INVENTION

1. Field of the Invention

The present invention relates to a detector which employs a ferro-magnetic thin film resistor element (hereinafter called "magneto-resistive element") using a magnetic anisotropic effect to detect the position of a linearly moving object or the rotational angle of a rotating object.

2. Description of the Prior Art

FIGS. 1(A) and 1(B) are a plan view and a front elevation showing an example of a magnetic-resistive element.

In FIGS. 1(A) and 1(B), the magneto-resistive element 2 and the terminals 3, 4 for external connections are formed on the surface of the substrate 1. The resistance of the magnetic-resistive element 2 changes according to the change of the intensity of the magnetic field in the direction of ±X shown in FIG. 1 whereas said resistance hardly changes in response to the change of the intensity of the magnetic field in other directions, and has what is called a magnetic anisotropic effect.

FIG. 2 shows a characteristic curve of said magneto-resistive element representing the change in the resistance of said magneto-resistive element with respect to the change of said intensity of the magnetic field in the direction of ±X.

In FIGS. 2, a, c, and e are the regions where the change of the resistance with respect to the intensity of the magnetic field is non-linear and b and d are the regions exhibiting a relatively good linear relationship in regard to the change of the resistance with respect to the intensity of the magnetic field.

The detector which utilizes the characteristic of the magneto-resistive element explained in FIG. 1 and FIG. 2 will hereinafter be described.

FIGS. 3(A) and 3(B) shows an example of a conventional detector which uses a magnetic-resistive element: FIG. 3(A) is a plan view, and (B) is a sectional view taken along line A—A of (A). In FIGS. 3(A) and 3(B), the same parts shown in FIG. 1 are represented by the same numbers.

Now, this conventional detector detects relative positions of both a movable element 8 and a stator 9 as the movable element 8 moves linearly along the stator 9, and the movable element 8 consists of a substrate which forms the magneto-resistive element 2 and terminals 3, 4 on the surface thereof and a permanent magnet 7 which functions to supply the bias magnetic field. On the other hand, the stator 9 includes on the plane opposite to the movable element 8 a large number of teeth like salients and slots of magnetic material (hereinafter called magnetic teeth). The opposing planes of the movable element 8 and the stator 9 are not illustrated, however, both planes are held by a travelling support system such as one using bearings so that a fixed clearance is maintained for maintaining the detector and the stator 9 parallel.

As shown in FIG. 3(A), it is generally known that when the magneto-resistive element 2 is connected through the terminals 3, 4 to an external constant-voltage regulated power supply 10, a fixed resistor 5, a ground 11, and an output terminal 6 and the movable element 8 moves along the stator 9 at a constant speed, an output like sinewave having half of the pitch of the pitch of the magnetic teeth of the stator 9 is obtained from the output terminal 6. This is because that the magnetic field generated by the permanent magnetic 7 is affected by the shapes of the magnetic teeth of the stator 9 to be bent cyclically thereby generating a cylindrical component in the magneto-sensitive direction (±X direction) with respect to the magneto-resistive element 2 of the movable element 8. As explained in FIG. 2, the resistance of the magneto-resistive element 2 changes according to the affected intensity of the magnetic field and thus there is a cyclic output of resistance in the form of a sinewave generated at the output terminal 6.

This condition is further described in detail using FIG. 4, and the same parts shown in FIGS. 3(A) and 3(B) have the same numbers while the redundant descriptions are omitted.

In FIG. 4, 101, 102, 103, 104, and 105 represent typical lines of magnetic force generated by the permanent magnetic 7. In FIG. 4, the magneto-resistive element 2 is at a position through which the line of magnetic force 103 passes and since the line of magnetic force 103 passes through the magneto-resistive element 2 vertically there will be no component in the direction of ±Z, and said line of magnetic force 103 is at the zero point of the magnetic field shown in the characteristic curve of FIG. 2 indicating that the resistance of the magneto-resistive element 2 is at a maximum. The maximum resistance is also indicated when the magneto-resistive element 2 is at positions where the lines of magnetic force 101 and 105 pass in FIG. 5 as the movable element 8 is moved.

Now, if we consider that the movable element 8 has moved and the magneto-resistive element 2 comes to the position of the line of magnetic force 102, the line of magnetic force 102 will have passed through the magneto-resistive element 2 diagonally.

By dividing this line of magnetic force 102 into orthogonal components, a component which passes vertically through the magneto-resistive element 2 and a component in the —X direction are obtained and the resistance of the magneto-sensitive part varies with the intensity of the magnetic field component in the —X direction.

Likewise, a magnetic field in the +X direction is generated by the line of magnetic force 104. As shown in FIG. 2, since the characteristic of the magneto-resistive element 2 shows a symmetrical shape centered around the zero point of the magnetic field, when the movable element 8 moves at a constant speed and the magneto-resistive element 2 moves from the position of the line of magnetic force 101 to that of the line of magnetic force 105 (for one cycle of the magnetic teeth), the change of the resistance during that time will be symmetrical from 101 to 103 and from 103 to 105 with respect to the position of the line of magnetic force 103 as a center.

In other words, an output of half the pitch of the magnetic teeth can be obtained. However, in a detector having a construction as above, since the characteristic of the magneto-resistive element shown in FIG. 2 is used in both the plus and minus directions with respect to the zero point of the magnetic field as a center, such a detector has a defect in that the output signal is considerably distorted by the effect of the non-linear region c. Especially, when a highly accurate detector capable of fine resolution is necessary, a reduction in pitch of the magnetic teeth of the stator 9 can enhance this detector capability to a certain extent on one hand but signal detection becomes difficult on the other hand. Therefore, an alternative for obtaining fine resolution of signals is also achieved in many cases by generally employing a method such as electrical interpolation. In such a case, it is desirable to have the output wave-form similar to the sinewave from the standpoint of the signal processing but it is difficult to materialize fine resolution by a conventional detector because of poor linearity caused by said distortion of the output signal.

Since the defect of the conventional detector as described above is caused by the use of the non-linear region c of the characteristic of the magneto-resistive element shown in FIG. 2, it is apparent that the region b or d having a relatively good linear characteristic shown in FIG. 2 should be used in order to remove this defect.

To do so, it is necessary to always apply a constant DC magnetic field (the center of the region b or the center of the region d in FIG. 2) having a $+X$ or $-X$ direction to the magneto-resistive element 2 in FIG. 1 though it is difficult to supply such a DC magnetic field (hereinafter called as the offset magnetic field) stably.

SUMMARY OF THE INVENTION

It is a primary object of the present invention to detect magnetic teeth of an object to be detected accurately by non-contacting means using a magneto-resistive element, and more particularly, to provide a magnetic detector generating less distorted detected signals by supplying an appropriate offset magnetic field to the magneto-resistive element and by using the magneto-resistive element in a region of good linearity with respect to the mangeto-resistive characteristic.

The magnetic detector of the present invention comprises first means having magnetic teeth on the surface thereof, second means which moves relative to said first means while maintaining a constant distance from the first means, and third means which includes a power supply or the like to supply electric current to the second means. Said second means comprises a permanent magnetic to generate a varied magnetic field according to teeth like salients and slots of said magnetic teeth and a magneto-resistive element which varies its resistance depending on the change of the magnetic field of said permanent magnet.

Furthermore, the magneto-resistive element also uses the magnetic field generated by said permanent magnet as an offset magnetic field and is therefore not arranged parallel to the magnetic teeth but is inclined at a certain angle relative thereto.

BRIEF DESCRIPTION OF THE DRAWINGS

FIGS. 1(A) and 1(B) are a plan view and a front elevation view showing an example of the magneto-resistive element used in the conventional embodiment and the embodiment according to the present invention;

FIG. 2 is a characteristic curve of the magneto-resistive element shown in FIG. 1;

FIGS. 3(A) and 3(B) are a partial plan view of a partial cross-sectional view showing an example of a conventional magnetic detector using the magneto-resistive element of FIGS. 1(A) and 1(B);

FIGS. 16 through 22 are plan views showing embodiments of the magneto-resistive element used respectively in the magnetic detector of the present invention.

DESCRIPTION OF THE PREFERRED EMBODIMENTS

Embodiments according to the present invention will now be described with respect to the drawings.

Figure 5:
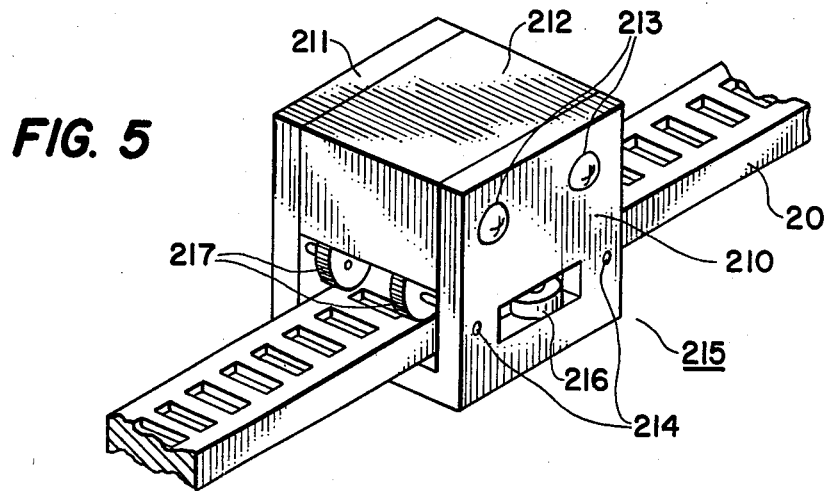
FIG. 5 is an external view showing an example of the mechanism of the magnetic detector according to the present invention.

FIG. 5 is an external view of the magnetic detector which uses the magneto-resistive element according to an embodiment of the present invention. In FIG. 5, a movable element 21 moves linearly along the stator 20.

The movable element 21 is comprised of a magneto-resistive element, a sensor housing 212 which incorporates therein a permanent magnet or the like, a fixture means 210 and 211 which hold therebetween said sensor housing 212, screws 213 which join the sensor housing and the fixture means, and bearings 216 which support the movable element 21 to permit it to move along the stator 20 including bearings 217 which hold a constant distance between the MR sensor and the stator. The stator 20 has a large number of magnetic teeth formed at a constant pitch on the surface thereof.

Figure 6A:
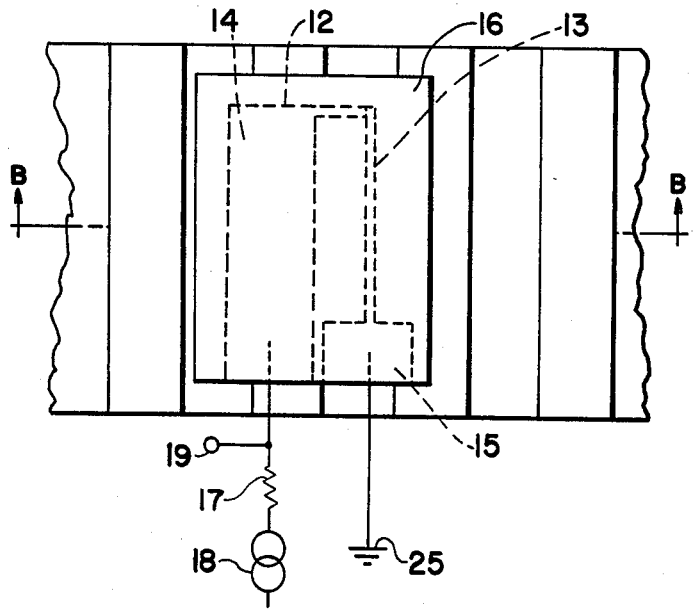
FIGS. 6(A) and 6(B) are a partial plan view and a partial cross-sectional view showing an embodiment of the magnetic detector according to the present invention.
Figure 6B:
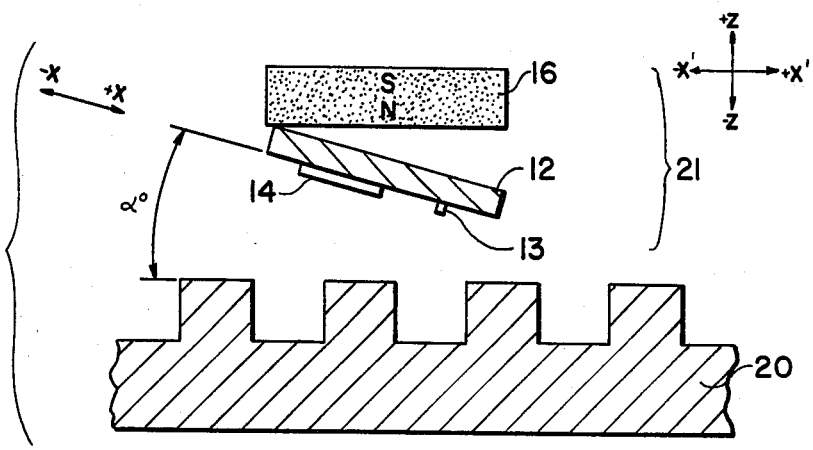

FIG. 6(B) shows a partial cross-sectional view of the magnetic detector which uses the magneto-resistive element according to an embodiment of the present invention, and FIG. 6(A) is a plan view. FIG. 6(B) is a cross-sectional view taken along line B—B of 6(A).

This detector detects relative positions of the movable element 21 and the stator 20 while said movable element moves linearly along said stator, and the movable element 21 is comprised of a substrate 12 with the magneto-sensitive part 13 consisting of the magneto-resistive element and terminals 14, 15 formed on the surface thereof and a permanent magnet 16 to supply a bias magnetic field.

The stator 20 has magnetic teeth having a constant pitch and formed on the plane opposing the movable element 21. Furthermore, the movable element 21 and the stator 20 are arranged as shown in FIG. 5, and more particularly, the substrate 12 and the stator 20 are inclined at an angle of while the permanent magnet 16 and the stator 20 are arranged in parallel. In FIGS. 6(A) and 6(B), the travelling support system to movably hold the movable element 21 along the stator 20 is not shown for the convenience of description. Said magneto-sensitive part 13 is connected, as shown in FIG. 6(A), through the terminals 14, 15 to the constant voltage power source 18, the fixed resistor 17, the ground 25, and the output terminal 19.

Figure 3B:
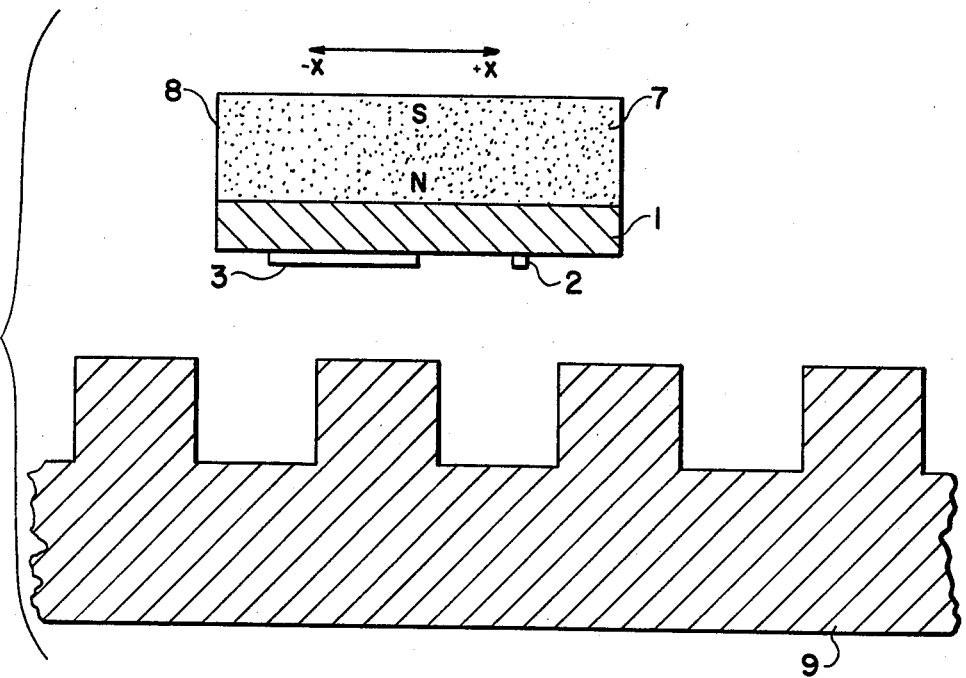
Figure 4:
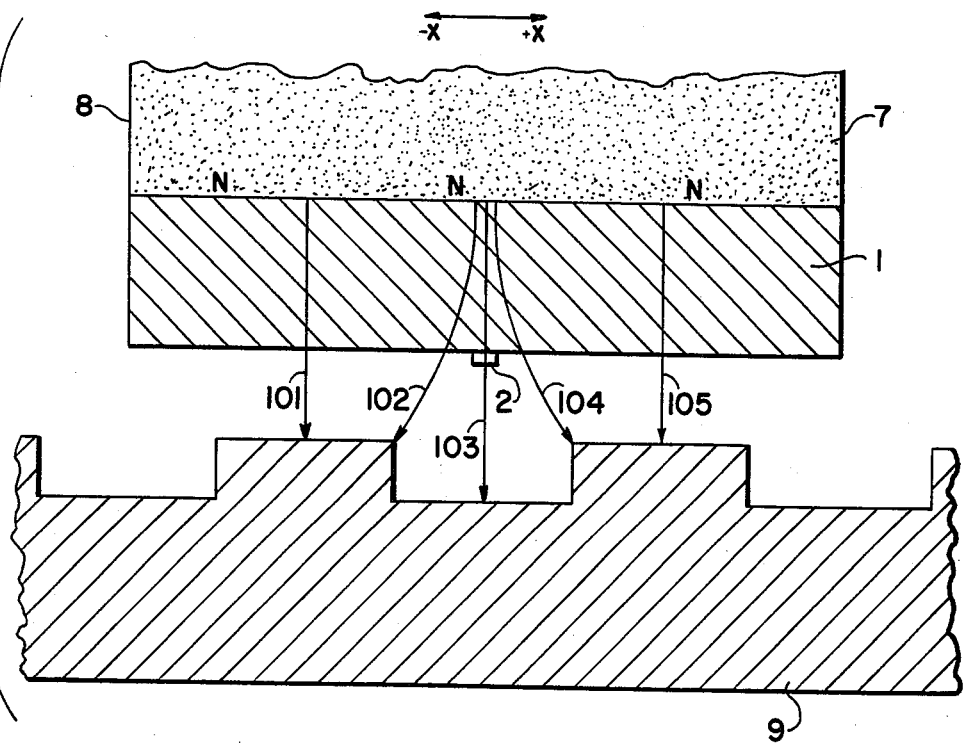
FIG. 4 is an enlarged partial cross-sectional view of the conventional magnetic detector shown in FIGS. 3(A) and 3(B)
Figure 7:
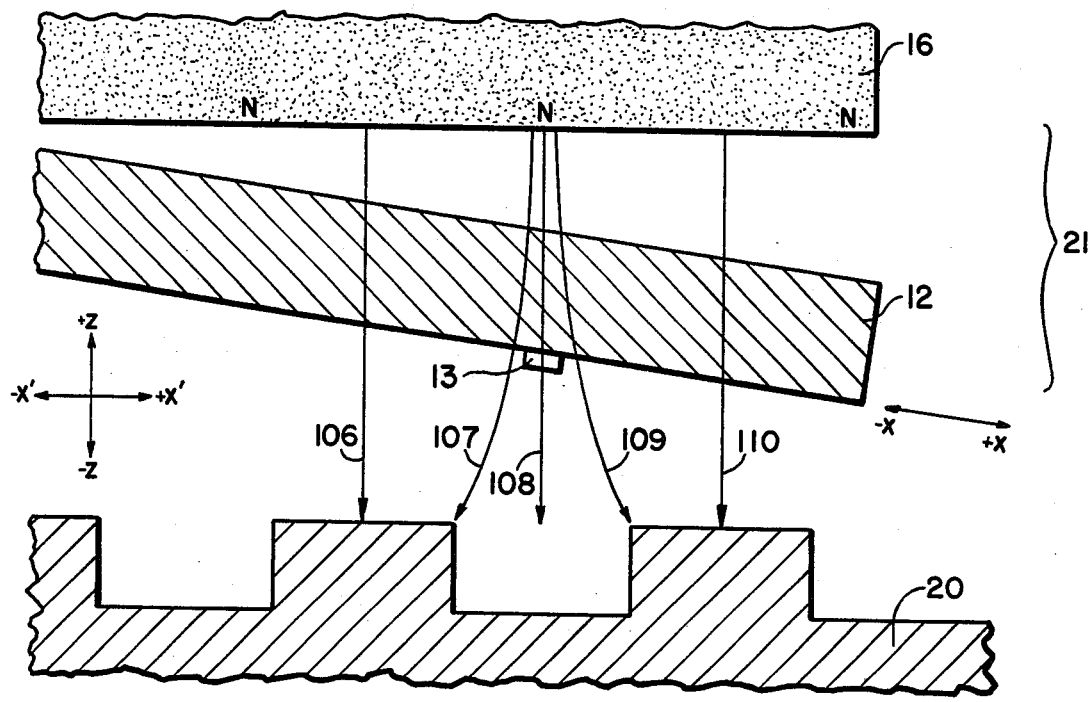
FIGS. 7 and 8 are enlarged partial cross-sectional views of the embodiment shown in FIGS. 6(A) and 6(B)

Operation of the detector according to the embodiments of the present invention composed as above will hereinafter be described. In FIG. 6, when the movable element 21 travels along the stator 20 in the direction of $\pm X^1$, the line of magnetic force moving from the permanent magnet 16 to the stator 20 (in the $-Z$ direction) changes its direction depending on the shapes of salients and slots of the magnetic teeth as in the case of the conventional embodiment shown in FIG. 4. Such a condition is shown in FIG. 7, of which 106, 107, 108, 109 and 110 represent typical lines of magnetic force generated from the permanent magnet 16.

Figure 8:
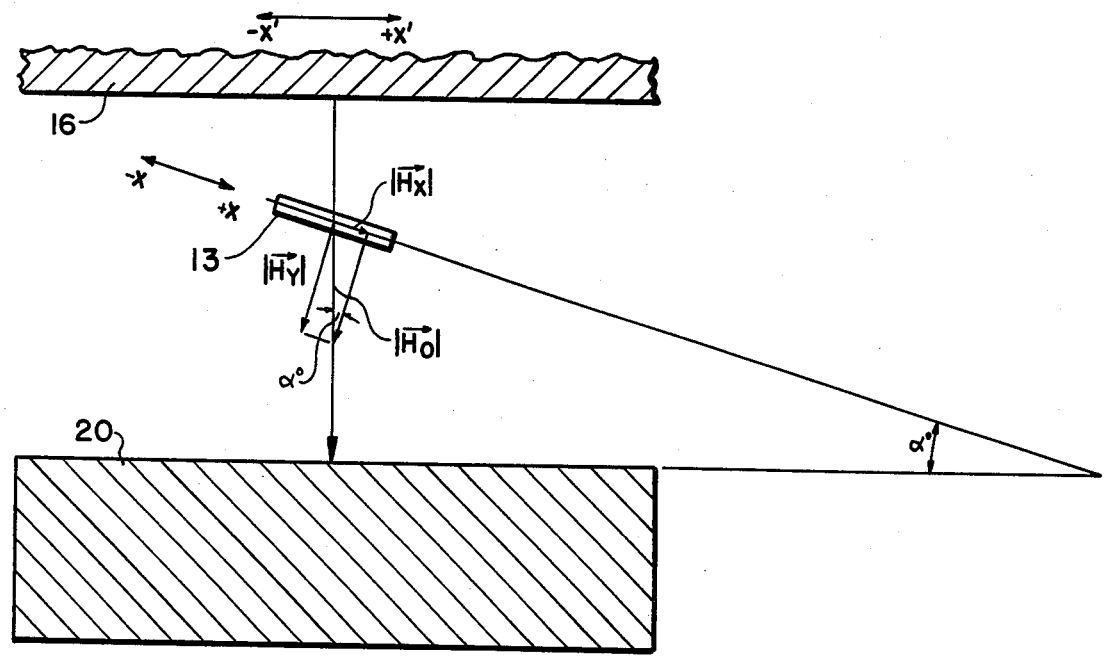

FIG. 8 shown a partial cross-sectional view wherein the magneto-sensitive part 13 is at a position where the line of magnetic force 106 passes. In this Figure, since the bias magnetic field $\vec{H_o}$ passes the magneto-sensitive part 13 diagonally, offset magnetic field $\vec{H_x}$ acts in the magneto-sensitive direction (in the $+X$ widthwise direction) of the magneto-sensitive part 13, and the strength of such offset magnetic field $\vec{H_x}$ is expressed by the following equation.

$$\vec{H_x} = \vec{H_x} \sin \alpha° \qquad (1)$$

By this process, the characteristic of the magneto-resistive element shown in FIG. 2 which is used in both the plus and minus directions with respect to the zero point of the magnetic field as a center can no be used in one direction, i.e., either the plus direction or the minus direction centering on the operation point A. The same applies to the case when the magneto-sensitive part 13 is at a position where the lines of magnet force 108 or 110 pass through.

This offset magnetic field $\vec{H_x}$ permits use in the regions b or d of relatively good linearity and avoids use in the region c of non-linearity of the characteristic of the magneto-resistive element shown in FIG. 2. Thus, the distortion of the output wave-form which has been conventionally problematic is improved considerably and a highly accurate detector is provided.

Other embodiments of the present invention will hereafter described in reference to the drawings.

Figure 9A:
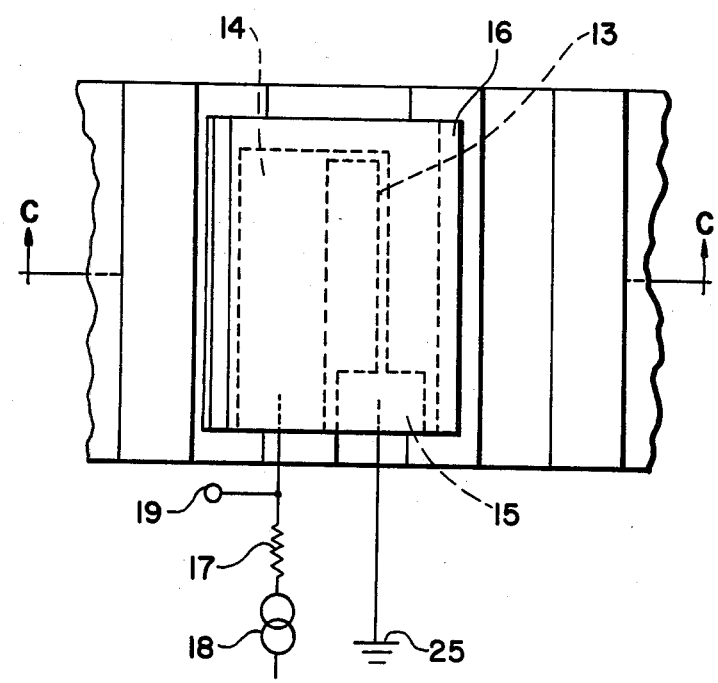
FIGS. 9(A) and 9(B) and FIGS. 10(A) and 10(B) are partial plan views and partial cross-sectional views showing other embodiments respectively according to the present invention.
Figure 9B:
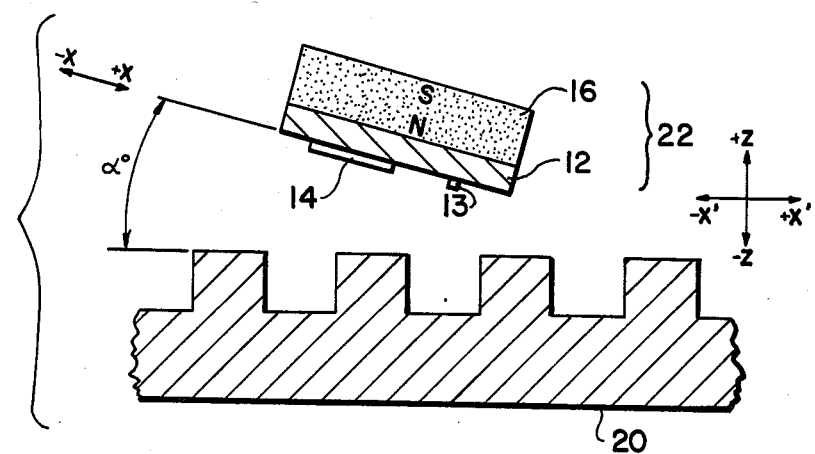

FIG. 9(B) is a partial cross-sectional view of the detector using the magneto-resistive element according to another embodiment of the present invention, 9(A) a plan view, and 9(B) a cross-sectional view taken along line C—C of (A). The same components of the first embodiment of this invention shown in FIGS. 6(A) and 6(B) are used, the same numbers are provided with those components in FIGS. 9(A) and 9(B) corresponding to those of the first embodiment, and therefore the description thereof is omitted.

This detector detects relative positions of the movable element 22 and the stator 20 as said movable element travels linearly along said stator and is different from the first embodiment of this invention shown in FIG. 5 in that the substrate 12 and the permanent magnet 16 are integral and inclined to the stator 20 at $\alpha°$.

In the detector of this embodiment, the magneto-sensitive part 13 is subjected to the offset magnetic field generated by the permanent magnet 16 as in the case of the first embodiment shown in FIGS. 6(A) and 6(B). It is therefore possible to use the magneto-resistive element in the regions b or d having relatively good characteristics of the magneto-resistive element shown in FIG. 2, and it is confirmed that a signal-like sinewave having less distortion is obtained from the output terminal 19.

Another embodiment of the present invention will hereafter be described with reference to the drawings.

Figure 10A:
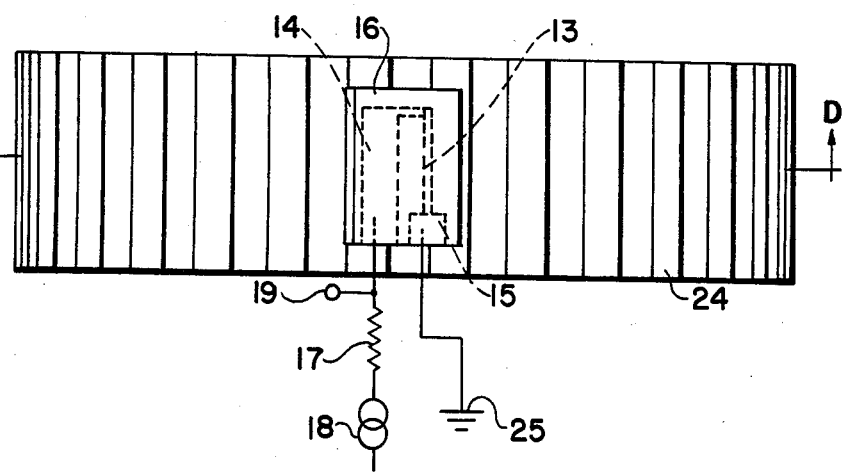
Figure 10B:
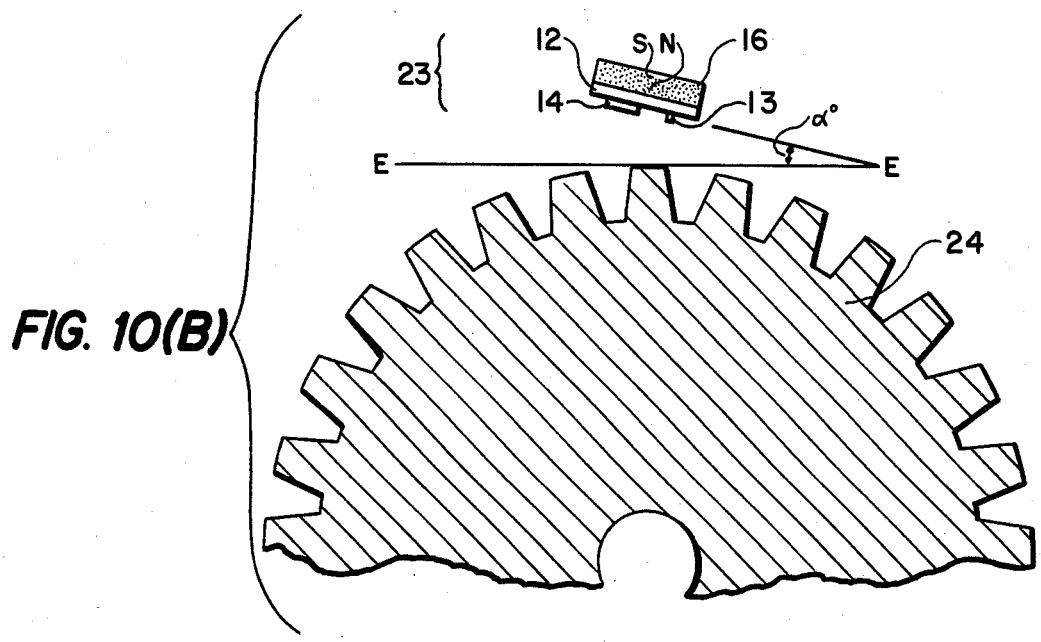

FIGS. 10(A) and 10(B) show a primary part of the magnetic detector using the magneto-resistive element according to another embodiment of this invention, FIG. (A) is a plan view, and (B) a front elevation view. The same components as those of the embodiment of this invention shown in FIGS. 6(A) and 6(B) are provided with the same numbers and the descriptions thereof is omitted here.

The magnetic detector is intended to detect the rotational position of the rotating gear 24 and is comprised of a gear 24 made from magnetic material and the sensor block 23 consisting of the substrate 12 and the permanent magnet 16. The sensor block 23 is arranged, as shown in FIG. 10(B), at an angle of $\alpha°$ with respect to the side of the gear 24 so as to detect the rotational position of the gear 24. In such a case, the magneto-resistive element changes its resistance according to the intensity of the magnetic field in the direction of $\pm X$ shown by an arrow in the figure.

In the magnetic detector of this embodiment, the operation and fundamentals are the same as those of the first embodiment of this invention shown in FIGS. 6(A) and 6(B) and the only difference is that the subject of the detection in the present embodiment is rotational motion. The offset magnetic field is supplied to the magnetic-sensitive part 13 while the sensor block is inclined an angle of $\alpha°$ with respect to salients and slots of the teeth of the gear 24 as shown in FIG. 10(B). Thus, the region of relatively good linear characteristics of the magneto-resistive element shown in FIG. 2 thereby is used and consequently an output like sinewave which has less distortion is obtained.

Figure 11A:
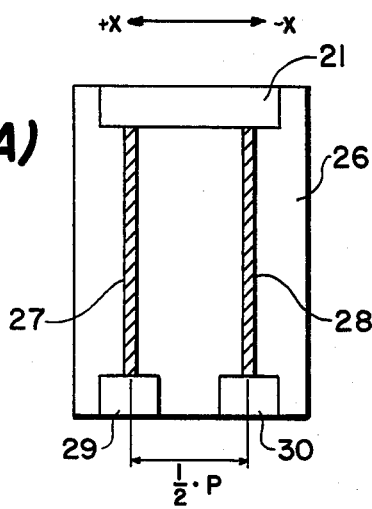
FIGS. 11(A) and 11(B) are a plan view and a front elevation view showing an embodiment of other magneto-resistive elements used for the magnetic detector according to the present invention.
Figure 11B:
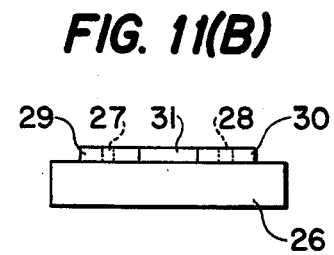

FIGS. 11(A) and 11(B) are illustrative of the appearance of another magneto-resistive element used for another magnetic detector of the present invention, FIG. 11(A) is a plan view, and FIG. 11(B) is a front elevation view.

In FIGS. 11(A) and 11(B), the magneto-resistive elements 27, 28 and the terminals 29, 30, 31 are formed on the surface of the substrate 26. Assuming that the pitch of salients and slots of the object to be detected (magnetic teeth in this case) is P, the magneto-resistive elements 27, 28 are arranged in parallel at a distance of P/2.

Figure 12A:
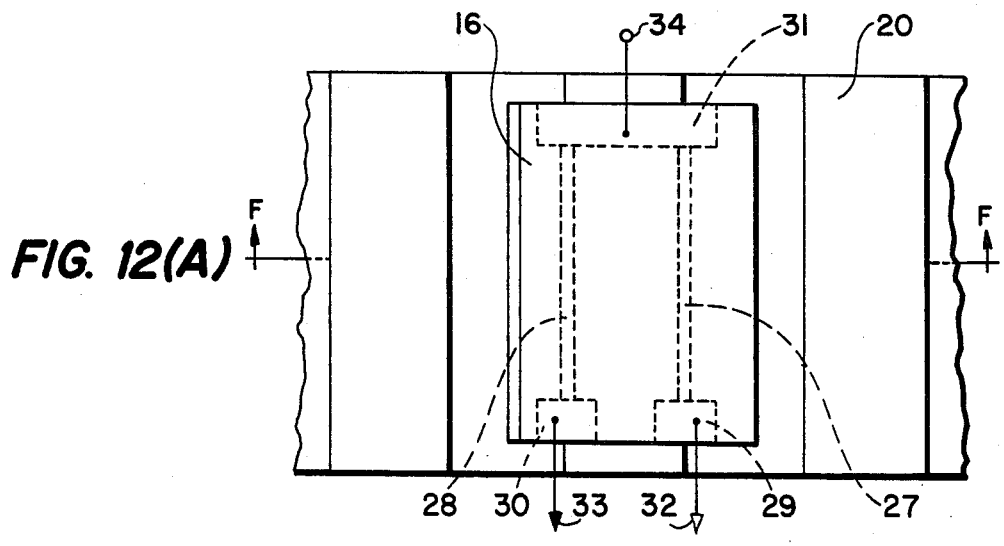
FIGS. 12(A) and 12(B) are a partial plan view and a partial cross-sectional view showing an embodiment of the magneto-resistive element of the present invention using the magneto-resistive element shown in FIGS. 11(A) and 11(B)
Figure 12B:
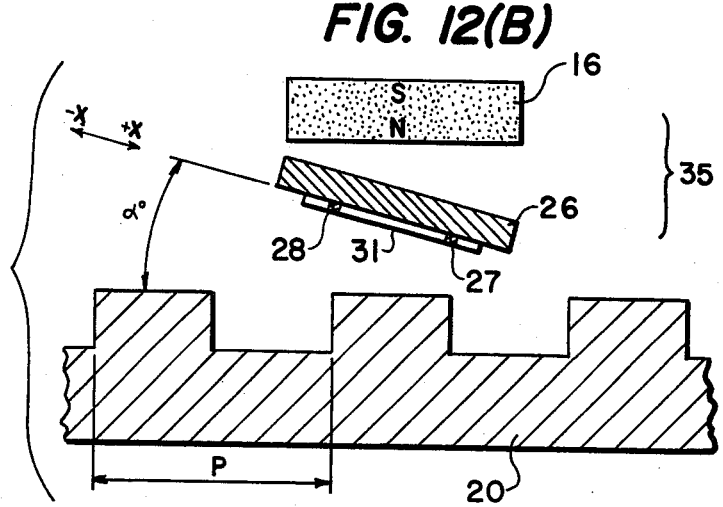

FIGS. 12(A) and 12(B) show an embodiment of the magnetic detector of the present invention, FIG. 12(A) is a plan view, and 12(B) is a cross-sectional view taken along line F—F of 12(A). The magneto-resistive element shown in FIGS. 11(A) and 11(B) is used in the embodiment.

The purpose of the detector is to detect the relative positions of the movable element 35 and the stator 20 as the former travels linearly along the latter. The movable element 35 is comprised of the magneto-resistive elements 27, 28 and the terminals 29, 30, 31 which form the substrate 26 described in FIGS. 11(A) and 11(B) and the permanent magnet 16 for supplying the bias magnetic field to the magneto-resitive elements 27, 28. The stator 20 has magnetic teeth spaced at a pitch P with its salients and slots formed on the plane opposing the movable element 35 thereof. Furthermore, the movable element 35 and the stator 20 are arranged as shown in FIG. 12(B) and more particularly, the substrate 26 is inclined at an angle of α° with respect to the stator 20 while the permanent magnetic 16 is arranged in parallel with the stator 20. As shown in FIG. 12(A), said magneto-resistive elements 27, 28 are connected through the terminals 29, 30, 31 to the constant current regulated power supplies 32, 33 and the output terminal 34 in a half-bridge and the constant-current regulated power supply in the case of this embodiment shall be +E volt and −E volt respectively. To avoid the complication of the drawings, the travelling support system to hold the movable element 35 movably along the stator 20 is not shown in the drawing.

Operation of the detector of this embodiment as constructed above will hereinafter be described. In FIG. 11(B) and FIG. 12(B), both of the magneto-resistive element 27 and the magneto-resistive element 28 are subjected to almost equal offset magnetic fields $\overline{Hx}$, as in the case of the embodiment of this invention shown in FIG. 6(B), by inclining them at an angle of α°, with respect to the magnetic teeth, and have the same characteristic as same characteristic of the magneto-resistive element shown in FIG. 2. The resistance varies centering upon the operating point A according to the external magnetic field. However, as shown in FIG. 12(A), since the magneto-resistive element 27 and the magneto-resistive element 28 are arranged by deviating their phases by P/2 with respect to the pitch P of the magnetic teeth of the stator, each magneto-resistive element will be given the signal magnetic field which has a phase deviation of 180°.

Figure 13:
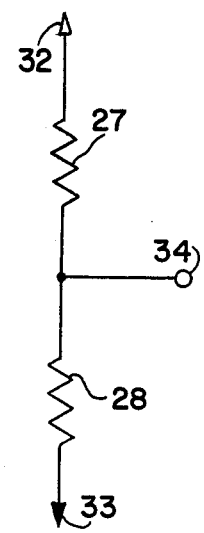
FIG. 13 is an equivalent circuit diagram showing electrical connections of the magneto-resistive element used in FIGS. 12(A) and 12(B)

FIG. 13 is an equivalent circuit diagram to clarify the electrical connections of the embodiment shown in FIG. 12(A) and each component corresponding to that of FIG. 12(A) is provided with the same number as that of FIG. 12(A), and the description thereof is therefore omitted.

In FIG. 13, assuming that the resistance of the magneto-resistive element 27 is Q and that of the magneto-resistive element 28 is R, the output signal Es generated at the output terminal 34 is expressed by the following equation.

$$ES = E \cdot (Q-R)/(R+Q) \qquad (2)$$

Said resistance Q and R have components of the resistance Q1 and R1 of the operating points determined by the magnitude of the offset magnetic field $\overline{Hx}$ and the varying resistance Q(Hs) and R(Hs) which change according to the signal magnetic field respectively. Since equal offset magnetic fields $\overline{Hx}$ are given to the magneto-resistive element 27 and the magneto-resistive element 28 respectively, Q1 and R1 are equal. Since signal magnetic fields respectively deviated by 180° are supplied to the magneto-resistive element 27 and the magneto-resistive element 28 as well, the relation between the varying resistance Q(Hs) and R(Hs) will almost satisfy the following equation.

$$Q(Hs) = -R(Hs) \qquad (3)$$

Substituting these contents into the equation (2) will give the following.

$$Es = E \cdot 2Q(s)/2Q1 \qquad (4)$$

Since E and Q1 are constant, the equation (4) means that the output signal Es is proportional to the varying resistance Q(Hs) of the resistance of the magneto-resistive element 27. Therefore, as shown in FIG. 12, if the magneto-resistive elements 27, 28 are used in regions of relatively good linearity by tilting them at an angle of α° with respect to the magnetic teeth of the stator 20, a good output signal which has less distortion in proportion to the given signal magnetic field can be obtained. Since the magneto-resistive element 27 and the magneto-resistive element 28 are arranged close together on the same substrate, the ambient environment to which both are exposed are identical and temperature does not effect uniform resistance. For this reason, if the connection is made as shown in FIG. 13 and the ambient temperature rises causing the resistance of the magneto-resistive element 27 to change, the resistance of the magneto-resistive element 28 also changes to approximately the same extent, and consequently there is little temperature drift in the output signal of the output terminal 34.

Figure 14A:
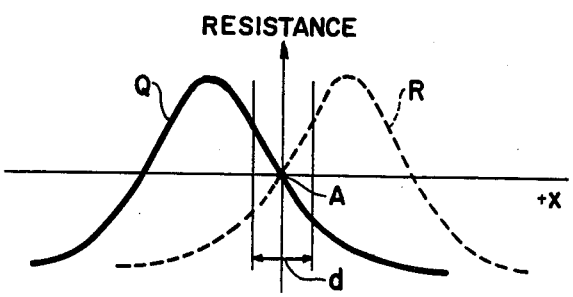
FIGS. 14(A), 14(B) and 14(C) are diagrams showing fundamentals of the magnetic detector of the present invention.
Figure 14B:
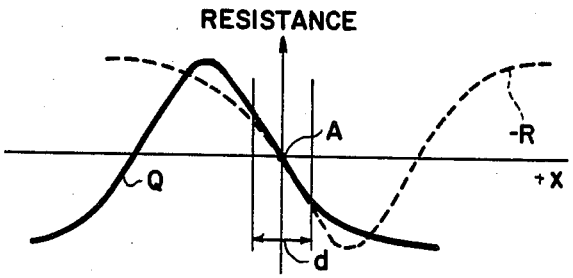
Figure 14C:
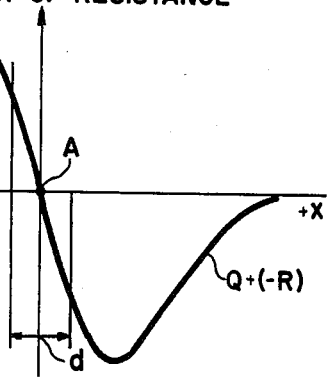

FIGS. 14(A), 14(B) and 14(C) are conceptual drawings representing a relation between the magneto-resistive element 27 and the magneto-resistive element 28. The magneto-resistive element 27 and the magneto-resistive element 28 have uniform magneto-resistive characteristics and their phases are deviated by 180° so that signal magnetic fields of equal amplitude are given.

FIG. 14(A) illustrates such a relation for easy and intuitive understanding though not accurate. As is apparent from equation (4), since the output signal Es is proportional to the varying resistance, the characteristic of magnetic field-resistance of the magneto-resistive element will hereafter be considered about the operating point.

In FIG. 14(A), the resistance of the magneto-resistive element 27 and the magneto-resistive element 28 changing with changes in the intensity of the magnetic field are Q and R respective in agreement with the description of FIG. 13. In this instance, the same signal magnetic fields are given to the magneto-resistive elements 27 and 28 for convenience, and the resistance R of the magneto-resistive element 28 is symmetrical with respect to resistance Q about the vertical axis passing through the operating point A.

The horizontal axis indicates the strength of the signal magnetic field and the vertical axis indicates the variation of the resistance of the magneto-resistive elements 27 and 28 with respect to the operating point A as the original point. The relation between vertical axis and horizontal axis is the same regarding FIGS. 14(B) and (C). It is now understood from equation (2) that the output signal Es is proportional to (Q−R), and FIGS. (B) and (C) are diagrams showing such a relation. Since (Q−R) of equation (2) can be rewritten as {Q=(−R)}, the resistance R of the magneto-resistive element 28 in FIG. 14(A) is made as −R by turning over the resistance vertically and symmetrically with respect to the horizontal axis passing through the operating point. Therefore, in FIG. 14(B), addition of the resistance Q of the magnetic-resistive element 27 and the resistance −R of the magneto-resistive element 28 gives said (Q−R).

FIG. 14(C) shows the result of the addition of Q and −R of FIG. 14(B). If a signal magnetic field in the range of d of FIG. 14(C) is given, the corresponding resistance changes into one with a good characteristic as shown in the figure.

Figure 15:
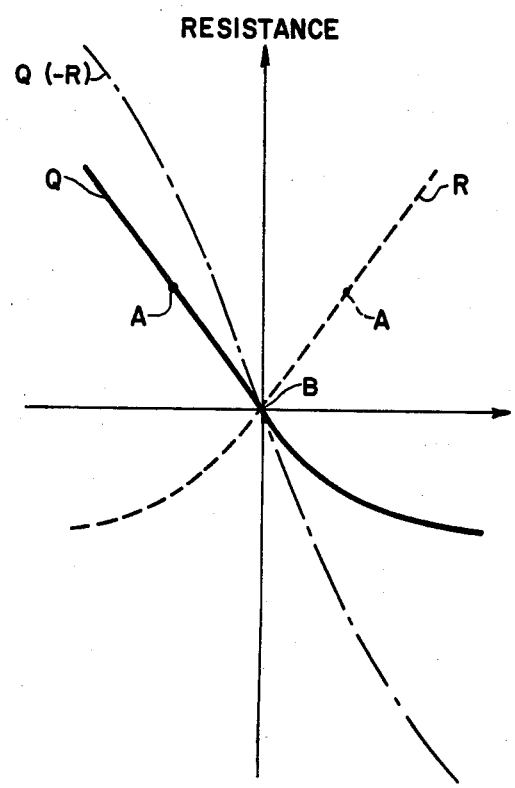
FIG. 15 is a diagram showing fundamentals of the magnetic detector of the present invention.

So far, when the appropriate offset magnetic field $\overline{H_x}$ is given to the magneto-resistive element, the magneto-resistive element is used in a region exhibiting relatively good linear magnetic field-resistance characteristics of the magneto-resistive element. However, we have noted some problems in actually giving the offset magnetic field having a suitable magnitude to the magneto-resistive element. Firstly, non-uniform magnetization of the permanent magnet which gives the magnetic field to the magneto-resistive element is one of the problems. When the intensity of the magnetic field generated by the permanent magnet is changed, the magnitude of said offset magnetic field $\overline{H_x}$ is changed accordingly. Secondly, though the offset magnetic field is obtained by tilting the magnetic-resistive element at an angle of $\alpha°$ with respect to the magnetic teeth of the stator, it is extremely difficult to accurately establish the angle of and therefore the offset magnetic field $\overline{H_x}$ of suitable magnitude can be obtained stably. As a result of this, the signal magnetic field $\overline{H_x}$ of suitable magnitude can not be obtained stably. As a result of this, the signal magnetic field which swings centering the offset magnetic field $\overline{H_x}$ will include the non-linear region among the magneto-resistive characteristic of the magneto-resistive element. FIG. 15 is illustrative of such condition.

FIG. 15 is a conceptual drawing showing the relation of the magneto-resistive element 27 and the magneto-resistive element 28 when the offset magnetic field $\overline{H_x}$ is changed due to the reason enumerated above and the operating point deviates from the point A in FIGS. 14(A), 14(B) and 14(C) (the center of the region of relatively good linearity) where it is located at point B.

In FIG. 15, since the output signal ES is proportional to {Q+(−R)} as in the case of FIG. 14(C), the linearity of {Q+(−R)} is required. As compared, however, with the case wherein the magneto-resistive element 27 is used as one element, the non-linear region of the magneto-resistive element 3 is compensated in the region of good linearity of the magneto-resistive element 28 while the non-linear region of the magneto-resistive element 28 is compensated in the region of good linearity of the magneto-resistive element 27. Therefore, the region of relatively good linearity will expand as shown in the Figure. According to such conditions, it has become possible to hole the distortion of the output signal smaller than the case wherein the magneto-resistive element is used as one element should be magnitude of the offset magnetic field $\overline{H_x}$ vary to some extent.

Other embodiments of the present invention will hereafter be described in reference to the drawings.

FIG. 16 through FIG. 22 are plan views showing embodiments of the magneto-resistive elements which can be used for the magnetic detector of the present invention. Since each magneto-resistive element can be considered to be replaced by the magneto-resistive element 27 and 28 which are used in the embodiment of the magnetic detector shown in FIGS. 12(A) and 12(B), components such as the permanent magnet and stator will hereafter be omitted from description and the description will be limited to the magneto-resistive element only.

Figure 16:
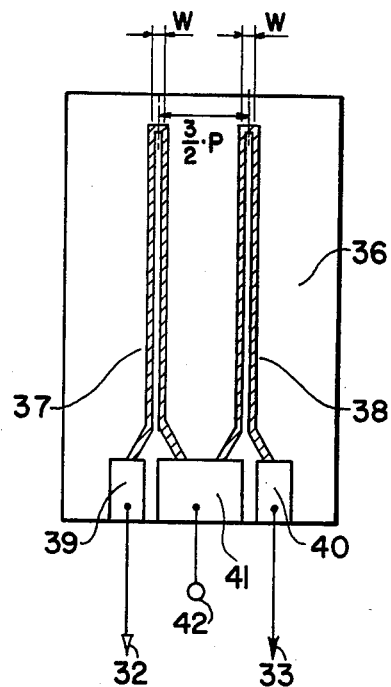

FIG. 16 shows an embodiment of the magneto-resistive element used in the magnetic detector of the present invention. On the surface of the substrate 36 are magneto-resistive elements 37 and 38 and terminals 39, 40, 41 and more particularly, the terminals 39, 40 are connected to the constant-current regulated power supplies 32, 33 to thereby obtain the output signal from the output terminals. The magneto-resistive elements 37 and 38 are arranged at spaces of 3/2·P with respect to the pitch P of the magnetic teeth and one end of each element is connected electrically be terminal 41. Furthermore, as shown in FIG. 16, each of the magneto-resistive elements 37, 38 are bent in half within the same plane (on the surface of the substrate 36 in this case) the halves having a constant space W therebetween whereas said constant space W is preferred to be relatively small with respect to the pitch P of the magnetic teeth.

Since the operating principle of the magneto-resistive element composed as above is basically the same as that of the embodiment shown in FIGS. 12(A) and 12(B), detailed description will be omitted. In the case of the embodiment of the present invention shown in FIG. 16, however, it is different in that the magneto-resistive element is bent in half, the halves being spaced apart by a constant space W. Since the constant space W is very small as described above, it is apparent that almost the same result occurs as in the example of FIGS. 12(A) and 12(B). Wherein the magneto-resistive element without the bend is arranged at the center line of the bend. In addition, the embodiment of the present invention has an advantage wherein the detection sensitivity can be increased by doubling the resistance of the magneto-resistive element according to the shape of the bend.

Figure 17:
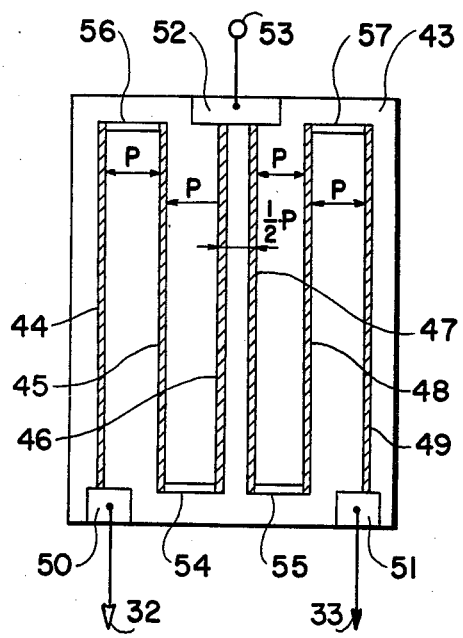

FIG. 17 shows another embodiment of the magneto-resistive element used in the detector of the present invention. On the surface of the substrate 43 are magneto-resistive elements 44, 45, 46, 47, 48, 49, terminals 50, 51, 52, and connectors 54, 55, 56 to connect each of the magneto-resistive elements electrically. All of these components are connected electrically as shown in the Figure, and more specifically, the terminals 50, 51 are connected to constant-current regulated power supplies 32 and 33 while the terminal 52 is connected to the output terminal 53. The magneto-restictive elements 44, 45, 46 are arranged respectively at spaces P to comprise a first group of elements and the magneto-resistive elements 47, 48, 49 are also arranged at spaced P to comprise a second group of elements. Each element of the first group of elements and each element of the second group of elements are apart from each other by a space which is equal to $(n+\frac{1}{2})·P$ (n is an integer).

In the magneto-resistive element above, the first group of elements and the second group of elements respectively correspond to the magneto resistive element 27 and the magneto-resistive element 28 of the embodiment shown in FIGS. 12(A) and 12(B). Because the magneto-resistive elements are spaced at the pitch P they are delayed by 360° in terms of the phase angle, that is to say, there is no delay in the phase angle. For this reason, the same effect of FIGS. 12(A) and 12(B) can also be obtained in this embodiment. In addition, since this embodiment has an advantage in that the sensitivity is tripled by using three magneto-resistive elements of the same phase in series and each of the three magneto-resistive elements connected in series detects different magnetic teeth simultaneously and averages the result of detection, it is advantageous to reduce the effect caused by breakage and the like of the magnetic teeth which is an object to be detected as compared with a case wherein the magnetic teeth are detected by the magneto-resistive element using one element.

Figure 18:
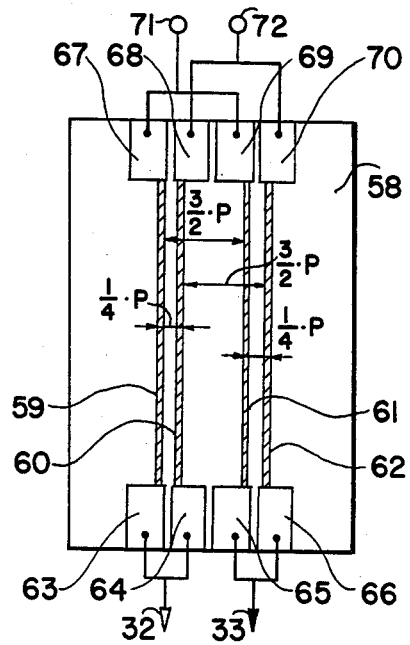

FIG. 18 shows another embodiment of the magneto-resistive element used in the detector of the present invention. On the surface of the substrate 58 are magneto-resistive elements 59, 60, 61, 62 and terminals 63, 64, 65, 66, 67, 68, 69, 70, and the magneto-resistive elements and the terminals are electrically connected as shown in FIG. 18. More particularly, the terminals 63, 64, 65, 66 are connected to the constant-current regulated power supplies 32 and 33 and the pairs of magneto-resistive elements 59 and 61 (or 60 and 62) are spaced apart by 3/2·P while the pairs of magneto-resistive elements 59 and 60 (or 61 and 62) are spaced apart by $\frac{1}{4}$·P respectively with respect to the pithc P of the magnetic teeth to be detected.

Detailed description of the operating principle of the magneto-resistive element above is omitted since it is basically the same as that of the embodiment shown in FIGS. 12(A) and 12(B). However, the magneto-resistive element 59 (or 60) in FIG. 18 corresponds to the magneto-resistive element 27 in FIGS. 12(A) and 12(B) and the magneto-resistive element 61 (or 62) in FIG. 18 corresponds to the magneto-resistive element 28 in FIGS. 12(A) and 12(B).

The magneto-resistive element of FIGS. 12(A) and 12(B) and the magneto-resistive element of FIG. 18 are different in that the former can obtain from the output terminals 71 and 72 the output signal of two phases delayed by 90°. According to these features, the embodiment of FIG. 18 has an advantage in that it can detect the direction of the relative motion of the movable element and the stator.

FIG. 19 shows another example of the embodiment of the magneto-resistive element used in the detector of the present invention. On the surface of the substrate 73 are magneto-resistive elements 74, 75, 76, 77, 79, 80, 81 and terminals 82, 83, 84, 85, 86, 87, 88, 89, 90, 91, 92, 93, 94, 95, 96, 97. All of these components are electrically connected as shown, the terminals 82,83 and 88, 89 are connected respectively with the output terminals 98, 99. In addition, the magneto-respective elements 74 and 78 (or 75 and 79, 76 and 80, 77 and 81) are spaced apart by P corresponding to the pitch P of the mangetic teeth which is an object to be detected, and connected in series. Furthermore, the first group of elements consisting of the magneto-resistive elements 74 and 78 and the the second group of elements consisting of the magneto-resistive elements of 76 and 80 are spaced apart by $\frac{1}{4}$·P respectively of each element thereof while the third group of elements consisting of the magneto-resistive elements 75 and 79 and the fourth group of elements consisting of the magneto-resistive element 77 and 81 are likewise spaced apart by $\frac{1}{4}$·P respectively of each element thereof. In addition, each element of the first and third groups of elements is arranged to provide a phase difference of $\frac{1}{4}$·P (=90°).

The present embodiment of the present invention above has two elements in each group of its elements as compared to the embodiment of FIG. 17 which has three elements in each groupof its elements, however, the basic principle is the same. The embodiment of FIG. 17 can obtain an output signal of one phase only whereas the embodiment of FIG. 19 can obtain an output signal of two phases. Thus the direction of motion can be determined by the detector of the latter embodiment.

FIG. 20 shows an example of another embodiment of the magneto-resistive element used in the detector of the present invention. On the surface of the substrate 120 are magneto-resistive elements 121, 122, 123, 124, 125, 126 and terminals 127, 128, 129, 130, 131, 132, 133, 134, 135, 136, 137, 138. Each magneto-resistive element and each terminal are electrically connected as shown in FIG. 20. More particularly, the terminals 127, 129, 131 and 128, 130, 132 are connected with the constant-current regulated power supplies 32 and 33 and the pairs of magneto-resistive elements 121 and 124 (or 122 and 125 or 123 and 126) are spaced apart by $\frac{1}{2}$P while the pairs of magneto-resistive elements 121 and 123, and 123 and 125 (or 124 and 126, and 122 and 124) are spaced apart by $\frac{1}{3}$P respectively with respect to the pitch P of the magnetic teeth to be detected.

Detailed descriptions of the operating principle of the magneto-resistive element above is also omitted since it is basically the same as that of the embodiment shown in FIGS. 12(A) and 12(B). However, the embodiment of FIG. 20 has three pairs of the magneto-resistive elements (121 and 124, 123 and 126, 125 and 122) which have the same function as the one pair of the magneto-resistive elements 27 and 28 in FIGS. 12(A) and 12(B) and each pair of the elements of FIG. 20 is arranged to have a phase difference of P/3 (=120°). Therefore, output signals of three phases respectively different by 120° can be obtained from the output terminals 139, 140, 141. It is needless to say that the same effect as that of the embodiment of FIGS. 12(A) and 12(B) can be obtained from each such pair as above.

Figure 21:
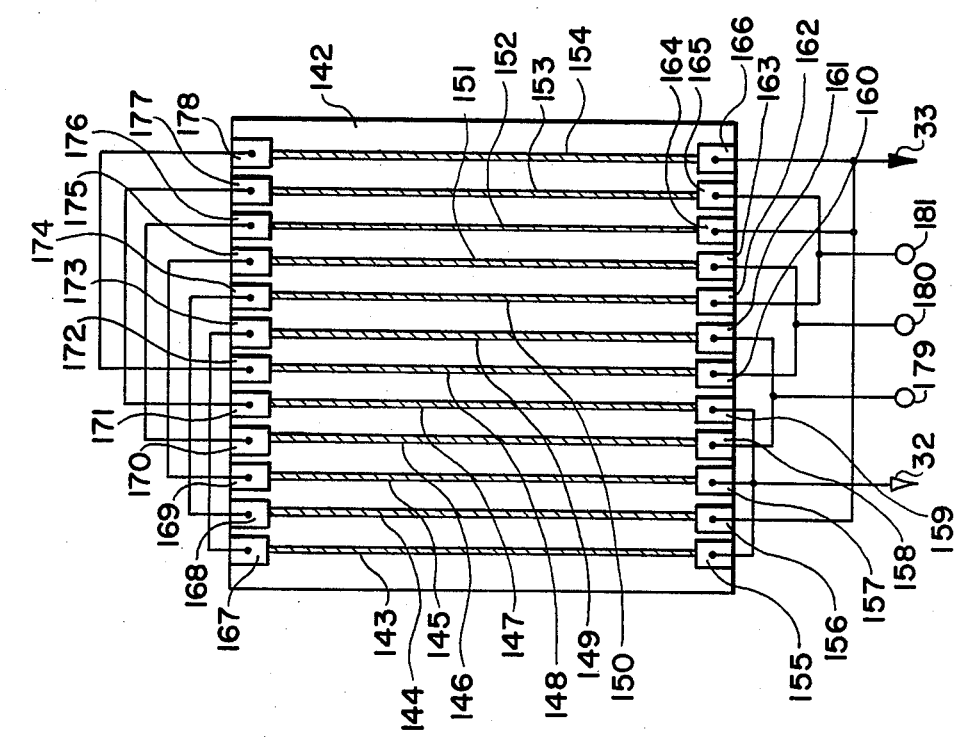

FIG. 21 shows an example of another embodiment of the magneto-resistive element used in the detector of the present invention. On the surface of the substrate 142 are magneto-resistive elements 143, 144, 145, 146, 147, 148, 149, 150, 151, 152, 153, 154 and terminals 155, 156, 157, 158, 159, 160, 161, 162, 163, 164, 165, 166, 167, 168, 169, 170, 171, 172, 173, 174, 175, 176, 177, 178. All of these components are electrically connected as shown in FIG. 21. The terminals 155, 157, 159 and 156, 164, 166 are connected with the constant-current regulated power supplies 32 and 33, and the terminals 158 and 161, 160 and 163, 162 and 165 are connected respectively with the output terminals 179, 180, 181. More particularly, the magneto-resistive elements 143 and 149 (or 144 and 150, 145 and 151, 146 and 152, 147 and 153, and 148 and 154) are spaced apart respectively by P (with the same phase) with respect to the pitch P of the magnetic teeth to be detected, and connected in series. In addition, the magneto-resistive elements 143 and the magneto-resistive element 145 are arranged to delay the phase by $\frac{1}{3}$·P (=120°), the magneto-resistive elements 145 and the magneto-resistive element 147 are arranged to delay the phase by $\frac{1}{3}$·P (=120°), and the magneto-resistive elements 143 and 146, 145 and 148, 147 and 150 are arranged respectively to delay the phase by $\frac{1}{2}$·P (=180°).

Whereas the embodiment of FIG. 19 outputs the output signal of two phases delayed by 90°, the embodiment of FIG. 21 above has a different number of elements and a different arrangement of elements so as to output the output signal of three phases delayed by 120°, and the basic operation is the same as the contents described in the embodiment of FIG. 17.

With the embodiments of FIG. 19, FIG. 20 and FIG. 21 described above, output signals of small DC drift can be obtained from each output terminal with respect to the change in the ambient temperature, by using the half-bridge with the magneto-resistive elements which are arranged separately to make pairs spaced apart by $(n+\frac{1}{2})\cdot P$.

However, each magneto-resistive element generates heat by itself because of the current. Especially, when a large number of magneto-resistive elements are arranged on the same substrate as in the cases of embodiments shown in FIG. 19, FIG. 20 and FIG. 21, the temperature of the magneto-resistive element arranged at the outer side of the substrate is often lower than that of the magneto-resistive element arranged close to the center of the substrate. DC drift of the output signal caused by such heat generated is as much as about 10% of the amplitude of the output signal in some cases.

In addition, the line of magnetic force generated from the permanent magnet is changed under the effect of the magnetic teeth and is also subjected to the effect of the magneto-resistive element for the signal detection which is a magnetic material arranged in the magnetic field of the permanent magnet. For this reason, it is desirable to arrange each magneto-resistive element on the substrate in good balance and at an equal spacing. However, as is apparent from the embodiments of FIG. 19, FIG. 20 and FIG. 21, the magneto-resistive elements at both ends of the substrate are poorly balanced respectively and the disturbance of the magnetic field is easily generated.

Consequently, the output signal may be distorted in some cases. It is the object of the embodiment shown in FIG. 22 to remove the problem occurring when a number of magneto-resistive elements are arranged on the same substrate.

Figure 22:
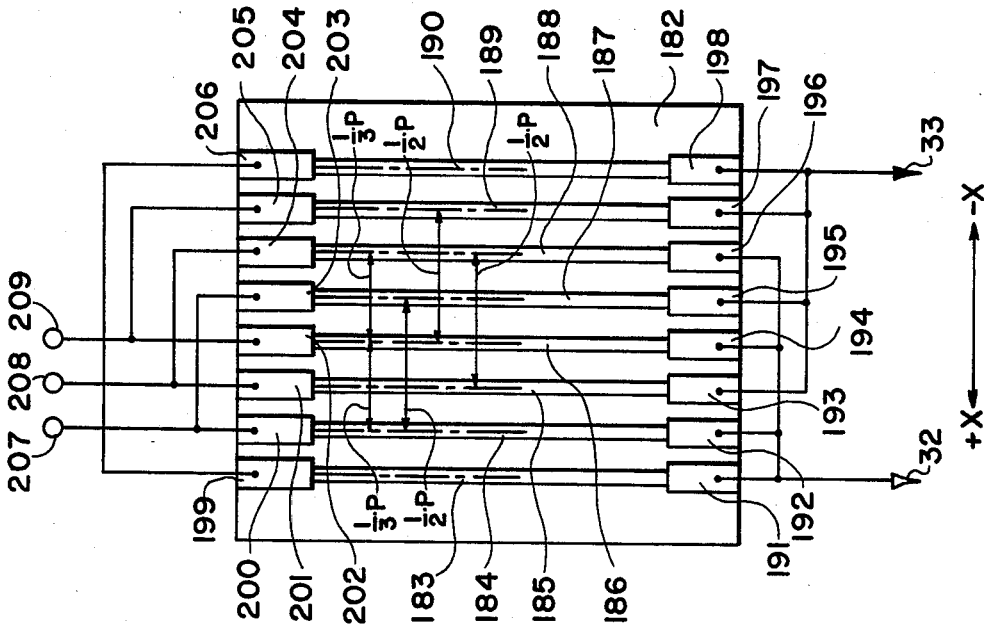

FIG. 22 shows an example of another embodiment of the magneto-resistive element used in the magnetic detector of the present invention. On the surface of the substrate 182 are magneto-resistive elements for signal detection 184, 185, 186, 187, 188, 189, magneto-resistive elements for compensation 183, 190, and terminals 191, 192, 193, 194, 195, 196, 197, 198, 199, 200, 201, 202, 203, 204, 205, 206.

All of the magneto-resistive elements for signal detection and compensation are electrically connected as shown in FIG. 22, and more particularly, the terminals 191, 192, 194, 196 are connected to the constant-current regulated power suply 32 and the terinals 193, 195, 197, 198 are conected to the constant-current regulated power supply 33.

In addition, a pair of magneto-resistive elements for signal detection 184 and 187 (or 186 and 189 or 188 and 185) are spaced apart by $\frac{1}{2}\cdot P$ with respect to the pitch P of the magnetic teeth to be detected while the magneto-resistive elements for signal detection 184 and 186, and 186 and 188 (or 185 and 187, and 187 and 189) are spaced apart by $\frac{1}{3}\cdot P$. Consequently, a 3-phase output signal delayed respectively by 120° is obtained from the output terminals 207, 208, 209, corresponding to the embodiment of FIG. 20. Furthermore, the magneto-resistive elements for compensation 183, 190 are arranged at both sides of the substrate with the magneto-resistive elements for signal detection disposed therebetween while the space between the magneto-resistive element for signal detection 184 and the magneto-resistive element for compensation 183 of this embodiment is arranged similarly to that of each magneto-resistive element for signal detection. Moreover, in this embodiment the magneto-resistive elements for compensation 183, 190 which are the same as the magneto-resistive elements for signal detection are used.

With the magneto-resistive element used in the magnetic detector of the present invention, the magneto-resistive elements for compensation 183, 190 in the present invention are of the same materials and shapes as the magneto-resistive elements for signal detection 184, 185, 186, 187, 188, 189 and have the same magneto-resistive characteristics. In addition, by connecting to the constant-current regulated power supplies 32 and 33 which are common to the magneto-resistive elements for signal detection, the magneto-resistive elements for compensation 183 and 190 generate heat by themselves almost like the magneto-resitive elements for signal detection. By this arrangement, it is possible to unify the temperature of the magneto-resistive elements for signal detection disposed between a pair of magneto-resistive elements for compensation 183 and 190.

More concretely, to solve the problem that the magneto-resistive elements 184 and 189 arranged at the outer sides of the substrate have lower temperatures than the magneto-resistive elements for signal detection 186 and 187 arranged near the center of the substrate, the heat generated by said magneto-resistive elements for compensation 183 and 190 is utilized for heating the magneto-resistive elements for signal detection 184 and 189 to consequently make the temperature of the magneto-resistive elements for signal detection uniform. But this arrnagement, the temperature drift of the output signal obtained from the output terminals 207, 208, 209 is reduced and the magnetic detector according to this embodiment is more accurate.

In addition, since the magneto-resistive elements for signal detection 184 and 189 are fabricated from magnetic material and are arranged at the outer most locations on the substrate where the magnetic balance is the poorest, an improvement in the magnetic balance, as shown in FIG. 22, is accomplished by the magneto-resistive element for compensation 183 and 190 which are arranged at further outer locations than are the magneto-resistive elements for signal detection and thus the disturbance of the magnetic field in such areas is decreased. By this arrangement, the distortion of the output signal obtained from the output terminals 207, 208, 209 is improved.

Morover, since the magneto-resistive elements for signal detection and compensation and the terminals are formed on the substrate 182 simultaneously by, for example, metallization, the manufacturing cost will not be increased by providing the magneto-resistive elements for compensation.

In the present embodiment, the magneto-resistive elements for compensation and the magneto-resistive elements for signal detection are made from the same material and have power supplied to them by the same type of constant-current regulated power supplies. However, they are not limited thereto. The object is to make the temperature distribution of a plurality of magneto-resistive elements for signal detection uniform and to improve and to improve the magnetic balance, and it is also possible to appropriately adjust the heating value of the magneto-resistive elements by for example changing the shape of the magneto-resistive element for compensation to thereby vary it resistance. In addition, with the same object, the distance from the magneto-resisitive element for compensation to the magneto-resistive element for signal detection can be changed. It is also possible to control the voltage of the constant-current regulated power supply for the magneto-resistive element.

We claim:

1. A magnetic position detector for detecting the position of a detected object, the detected object having a magnetic surface on which a plurality of magnetic teeth are spaced apart by a constant pitch in a pitch direction, said position detector comprising:

a detector element adjacent the magnetic surface of the detected object, said detector element comprising a permanent magnet means opposite the magnetic surface for generating a magnetic field that is defined between said permanent magnet means and the magnetic surface and the magnetic teeth of the detected object, and at least one thin ferromagnetic resistor between said permanent magnet means and the detected object and which is subjected to said magnetic field defined therebetween, said resistor being magnetically anisotropic in a magneto-sensitive direction thereof such that the resistance of said resistor varies with changes in the intensity of a component of said magnetic field acting in said magneto-sensitive direction;

power supply means electrically connected to said ferromagnetic resistor for supplying electric current through said ferromagnetic resistor in a direction parallel to the magnetic surface of the detected object and perpendicular to said magneto-sensitive direction; and fixing means for spacing said detector element from the detected object at a fixed distance and for fixing said ferromagnetic resistor at a predetermined angle relative to the surface of the detected object in the direction in which the magnetic teeth are spaced on the magnetic surface of the detected object such that said magneto-sensitive direction of said resistor extends in a direction that is inclined relative to the direction in which the magnetic teeth are spaced on the magnetic surface, said fixing means allowing said detector element and the detected object to be movable relative to one another in said pitch direction in which the magnetic teeth are spaced on the magnetic surfce of the detected object, whereby when said detector element and the detected object are so moved to any position relative to one another and the electric current is supplied to said ferromagnetic resistor, said component of the magnetic field acting in said magneto-sensitive direction of said resistor changes due to a relative change in position between the magnetic teeth and said detector element thereby chanign the resistance of said ferromagnetic resistor, said resistance indicating the position of the detected object relative to said detector element.

2. A magnetic position detector as claimed in claim 11, wherein said at least one ferromagnetic resistor comprises a pair of ferromagnetic resistors spaced from each other in said pitch direction by a distance $= (n + \frac{1}{2})P$, wherein said n=an integrer, P=said pitch.

3. A magnetic position detector as claimed in claim 1, wherein said power supply means comprises a constant current regulated power supply electrically connected to said at least one ferromagnetic resistor at one end thereof; and further comprising on output terminal electrically connected to said at least one ferromagnetic resistor at the other end thereof.

4. A magnetic position detector as claimed in claim 1, wherein said power supply means comprises a constant voltage regulated power supply electrically connected to said at least one ferromagnetic resistor at one end thereof; and further comprsiing an output terminal electrically connected to said at least one ferromagnetic resistor at the other end thereof at which said resistance, proportional to the electric current passing through said output terminal after passing through said ferromagnetic resistor, can be measured.

5. A magnetic position detector as claimed in claim 1, wherein said at least one ferromagnetic resistor comprises at least one group of ferromagnetic resistors the resistors of which are spaced apart in said pitch direction by a distance equal to $S \times P$, wherein S =an integer, P=said pitch, and said resistors of said at least one group are electrically connected in series.

6. A magnetic position detector as claimed in claim 2, and further comprising an output terminal electrically connected to one end respectively of both of the resistors of said pair of ferromagnetic resistors thereby connecting said resistors in series, and wherein said power supply means comprises means by which said pair of ferromagnetic resistors connected in series are connected between an constant voltage E1 and a constant voltage E2.

7. A magnetic position detector as claimed in claim 1, wherein said at least one ferromagnetic resistor comprises a first group of ferromagnetic resistors the resistors of which are spaced apart in said pitch direction by a distance equal to $S \times P$, said resistors of said first group being electrically connected to one another in series, and a second group of ferromagnetic resistors the resistors of which are spaced apart in said magneto-sensitive direction by a distance equal to $S \times P$, each of the resistors of said second group of ferromagnetic resistors being electrically connected to one another in series, wherein S=an integer, P=said pitch, and further comprising an output terminal electrically connected to said first group of ferromagnetic resistors and to said second group of ferromagnetic resistors for connecting said first and said second groups in series, and wherein said power supply means comprises means by which said first and said second groups connected in series are connected between a constant voltage E1 and a constant voltage E2.

8. A magnetic position detector as claimed in claim 1, wherein said at least one ferromagnetic resistor comprises a plurality of pairs of ferromagnetic resistors, each of said plurality of pairs of ferromagnetic resistors comprising a first resistor and a second resistor spaced from said first resistor in said pitch direction by a distance equal to $(l + \frac{1}{2}) P$, one resistor of each of said plurality of pairs of resistors spaced from a resistor of another pair of resistors by a distance equal to $(n + \frac{1}{2}) \times P$, wherein l=an integer, n=an integer, P=said pitch, and all of said ferromagnetic resistors of said plurality of pairs of ferromagnetic resistors being electrically connected in series.

9. A magnetic position detector as claimed in claim 1, wherein said at least one ferromagnetic resistor comprises a plurality of signal detection ferromagnetic resistors spaced apart from one another in said pitch direction; and further comprising a plurality of temperature compensation ferromagentic resistors at least one of which is spaced from said plurality of signal detection ferromagnetic resistors on either side thereof in said pitch direction for preventing the outermost ones of said pluarlity of said signal detection ferromagnetic resistors with respect to said pitch direction from exhibiting a different resistance than the innermost signal detection ferromagnetic resistors due to the exposure of said signal detection ferromagnetic resistors to the ambient temperature.

10. A magnetic position detector as claimed in claim 1, wherein said at least one ferromagnetic resistor comprises a plurality of pairs of first and second ferromagnetic resistors, each resistor of a pair of said plurality of resistors being spaced from the other in said pitch direction by a distance equal to $(n + a/2) P$, each of said first resistors of said pairs of ferromagnetic resistors being spaced from a second resistor of an adjacent pair of said ferromagnetic resistors in said pitch direction by a distance qual to $(K/m) P$, wherein n=an integer, K=an integer, m is an integer at least equal to 3, and P=said pitch.

* * * * *